US012669668B1

(12) United States Patent
Kaplan et al.

(10) Patent No.: US 12,669,668 B1
(45) Date of Patent: Jun. 30, 2026

(54) SPLICE ENCLOSURE

(71) Applicant: Multilink Inc., Elyria, OH (US)

(72) Inventors: Steven E. Kaplan, Elyria, OH (US);
Steve Brown, Amherst, OH (US)

(73) Assignee: MULTILINK INC., Elyria, OH (US)

( * ) Notice: Subject to any disclaimer, the term of this patent is extended or adjusted under 35 U.S.C. 154(b) by 298 days.

(21) Appl. No.: 18/233,426

(22) Filed: Aug. 14, 2023

Related U.S. Application Data

(60) Provisional application No. 63/397,484, filed on Aug. 12, 2022.

(51) Int. Cl.
G02B 6/44 (2006.01)
(52) U.S. Cl.
CPC ....... G02B 6/44465 (2023.05); G02B 6/4445 (2013.01); G02B 6/44515 (2023.05)
(58) Field of Classification Search
CPC ............ G02B 6/44465; G02B 6/44515; G02B 6/4445
See application file for complete search history.

(56) References Cited

U.S. PATENT DOCUMENTS

| 5,745,633 | A | 4/1998 | Giebel et al. |
| 9,927,592 | B2 | 3/2018 | Thompson et al. |
| 10,788,639 | B2 * | 9/2020 | Vermeulen .......... G02B 6/4455 |
| 10,816,746 | B2 | 10/2020 | Kaplan |
| 11,307,372 | B2 | 4/2022 | Kaplan |
| 2004/0161217 | A1 | 8/2004 | Hodge et al. |
| 2006/0098932 | A1 | 5/2006 | Battey et al. |
| 2006/0222309 | A1 | 10/2006 | Grubish et al. |
| 2007/0189694 | A1 | 8/2007 | Mullaney et al. |
| 2009/0148118 | A1 | 6/2009 | Gronvall et al. |
| 2011/0013875 | A1 * | 1/2011 | Bran .................. G02B 6/44526 385/135 |

* cited by examiner

*Primary Examiner* — Sung H Pak
(74) *Attorney, Agent, or Firm* — Lippes Mathias LLP

(57) ABSTRACT

A splice enclosure includes a housing having first and second housing portions that form an internal enclosed cavity in a first position and allow access to the cavity in a second position. The first housing portion receives an associated fiber optic cable in and out of the cavity. One or more associated optical fibers of the fiber optic cable are to be joined to associated drop cables in the first housing portion and the associated drop cables exit the housing through at least one drop cable passage. A seal assembly includes a first seal portion configured to seal around the associated fiber optic cable at the inlet and outlet passages, and a second seal portion configured to seal around the associated drop cables. A divider panel is hinged to the housing for selective positioning between a first position overlying the first housing portion and restricting access thereto in the first position, and a second position allowing access to the first housing portion and the spliced associated optical fibers.

14 Claims, 16 Drawing Sheets

SPLICE ENCLOSURE

This application claims the priority benefit of U.S. provisional application Ser. No. 63/397,484, filed Aug. 12, 2022, the entire disclosure of which is expressly incorporated herein by reference.

BACKGROUND

This disclosure relates to an enclosure for fiber optic cables, and particularly an enclosure that provides protection and access to a fiber-optic trunk line, as well as branch connections to individual subscribers such as home, apartment, businesses, etc.

Splice enclosures (also referred to as splice enclosure housings or splice enclosure assemblies) are generally known in the industry. Typically, a fiber optic cable extends through a wall, such as an end wall, of the enclosure and into an internal cavity of the enclosure. The splice enclosure includes a region where individual fibers provided in one or more buffer tubes are exposed and/or organized for splicing, and another region where individual pigtails or drop cables are joined to the fibers via adapters/fiber connectors.

More recently, the adapters are mounted in the enclosure housing. A cover is removed from the adapter and a connector provided on a terminal end of a drop cable is inserted into the adapter preferably in a snap-fit relationship. An audible "click" provides audible and/or tactile feedback to the installer that the connector of the individual drop cable is securely joined to the adapter.

A need exists for improved arrangements that facilitate accessibility to the fiber-optic cable, preparation of branch connections, and protection of the individual components during the process. An orderly layout (and segregation of the splice area from the drop distribution portion of the internal cavity of the splice housing) is desired to facilitate the preparation, installation, and connection of drop cables to a fiber-optic cable/trunk line, while providing a below-grade unit also designed for use in vault applications, permitting above grade or aerial applications, the ability to accommodate different types of feeder cables, and ease of access to a sealed housing. This disclosure provides at least one or more of the above-described features, as well as still other features and benefits.

SUMMARY

A new splice enclosure includes a housing having first and second housing portions that form an internal enclosed cavity in a first position and allow access to the cavity in a second position. The first housing portion has an inlet passage and an outlet passage to receive an associated fiber optic cable in and out of, and one or more associated optical fibers to be joined to associated drop cables in the first housing portion and the associated drop cables exiting the housing through at least one drop cable passage. A seal assembly includes a first seal portion configured to seal around the associated fiber optic cable at the inlet and outlet passages, and a second seal portion configured to seal around the associated drop cables. A divider panel is hinged to the housing for selective positioning between a first position overlying the first housing portion and restricting access thereto in the first position, and a second position allowing access to the first housing portion and the spliced associated optical fibers.

The divider panel is preferably secured to the second seal portion of the seal assembly.

At least one drop cable passage and second seal portion are formed in the second housing portion.

The divider panel is hinged to the second seal portion adjacent the at least one drop cable passage to allow the divider panel to selectively move between the first and second positions thereof without adversely impacting the associated drop cables.

A spring latch is dimensioned to engage a surface of the divider panel and maintain the divider panel in the first position.

The spring latch may include a protrusion that overlies and engages the divider panel in the first position.

The spring latch may be formed of a material allowing the spring latch to be resiliently deflected from the first position to the second position.

The spring latch protrusion preferably extends generally perpendicular and an angled portion at a terminal end thereof.

An adapter housing may also be secured to the divider panel.

The adapter housing preferably includes adapters on a face thereof that allow splitter or pigtails to be connectorized.

The pigtails extend to a splice tray mounted in the first housing portion.

Benefits and advantages of the present disclosure will become more apparent from reading and understanding the following detailed description.

DETAILED DESCRIPTION

Figure 1:
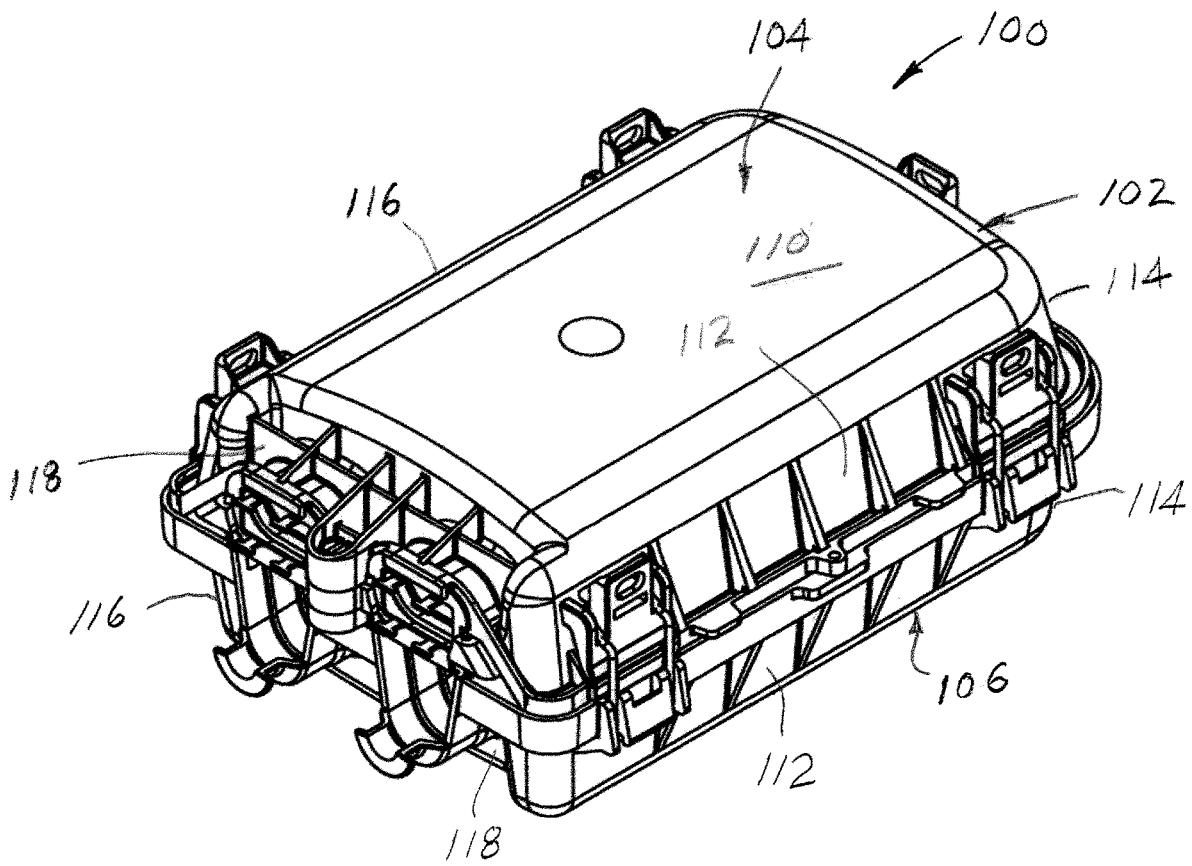
FIG. 1 is a perspective view of a splice enclosure in a closed, sealed state.

The following description with reference to the accompanying drawings is provided to assist in a comprehensive understanding of one or more embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. Various exemplary embodiments of the present disclosure are not limited to the specific details of different embodiments and should be construed as including all changes and/or equivalents or substitutes included in the ideas and technological scope of the appended claims. In describing the drawings, where possible similar reference numerals are used for similar elements.

The terms "include" or "may include" used in the present disclosure indicate the presence of disclosed corresponding functions, operations, elements, and the like, and do not limit additional one or more functions, operations, elements, and the like. In addition, it should be understood that the terms "include", "including", "have" or "having" used in the present disclosure are to indicate the presence of components, features, numbers, steps, operations, elements, parts, or a combination thereof described in the specification, and do not preclude the presence or addition of one or more other features, numbers, steps, operations, elements, parts, or a combination thereof.

The terms "or" or "at least one of A or/and B" used in the present disclosure include any and all combinations of words enumerated with them. For example, "A or B" or "at least one of A or/and B" mean including A, including B, or including both A and B.

Although the terms such as "first" and "second" used in the present disclosure may modify various elements of the different exemplary embodiments, these terms do not limit the corresponding elements. For example, these terms do not limit an order and/or importance of the corresponding elements, nor do these terms preclude additional elements (e.g., second, third, etc.) The terms may be used to distinguish one element from another element. For example, a first mechanical device and a second mechanical device all indicate mechanical devices and may indicate different types of mechanical devices or the same type of mechanical device. For example, a first element may be named a second element without departing from the scope of the various exemplary embodiments of the present disclosure, and similarly, a second element may be named a first element.

It will be understood that, when an element is mentioned as being "connected" or "coupled" to another element, the element may be directly connected or coupled to another element, and there may be an intervening element between the element and another element. To the contrary, it will be understood that, when an element is mentioned as being "directly connected" or "directly coupled" to another element, there is no intervening element between the element and another element.

The terms used in the various exemplary embodiments of the present disclosure are for the purpose of describing specific exemplary embodiments only and are not intended to limit various exemplary embodiments of the present disclosure. As used herein, the singular forms are intended to include the plural forms as well, unless the context clearly indicates otherwise.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having inconsistent or exaggerated meanings unless they are clearly defined in the various exemplary embodiments.

Figure 2:
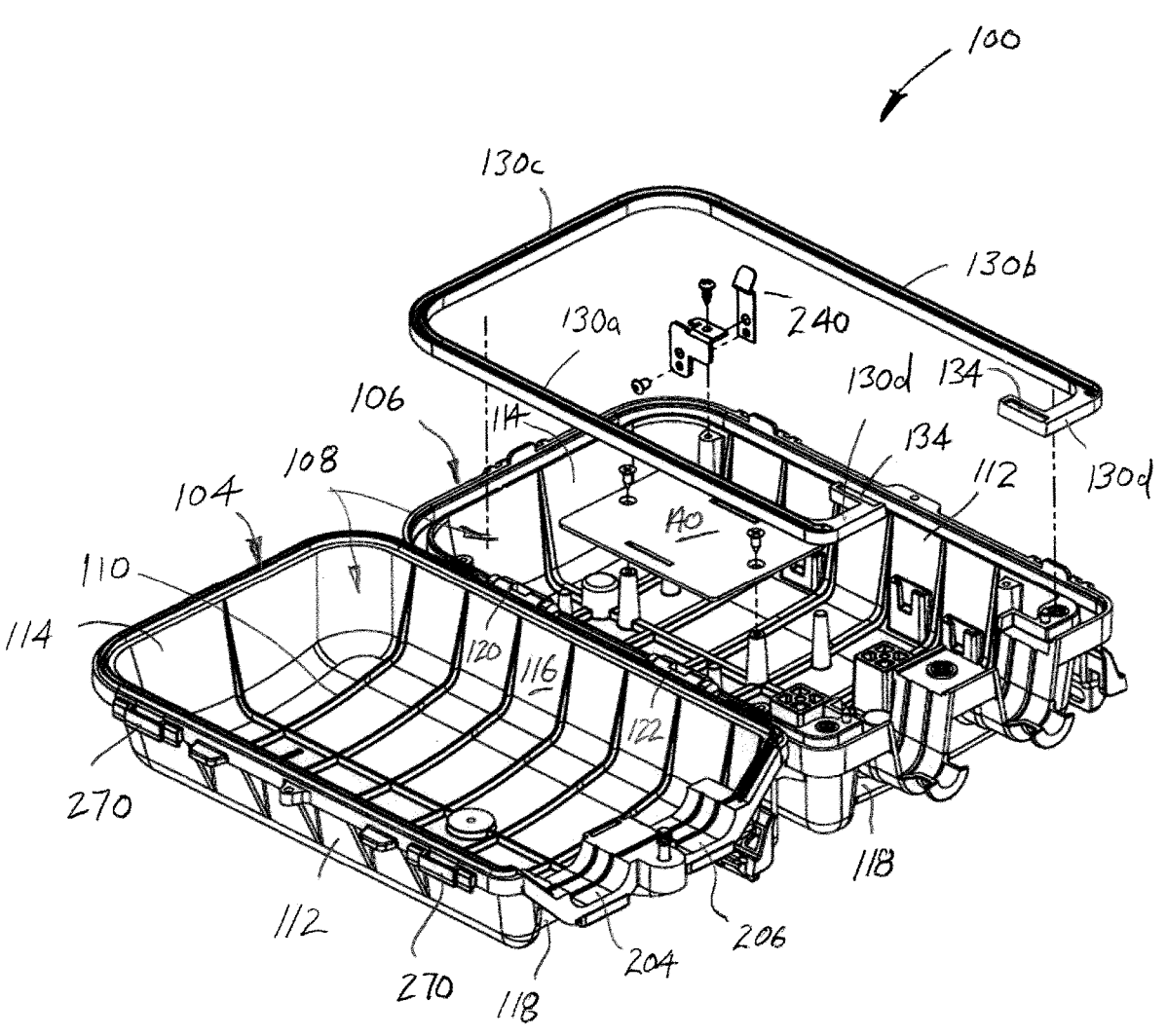
FIG. 2 is a perspective view of the splice enclosure of FIG. 1 in an open state with select components removed from the splice enclosure, and also showing in exploded relation a gasket perimeter seal and a portion of a splice tray mounting plate.
Figure 3:
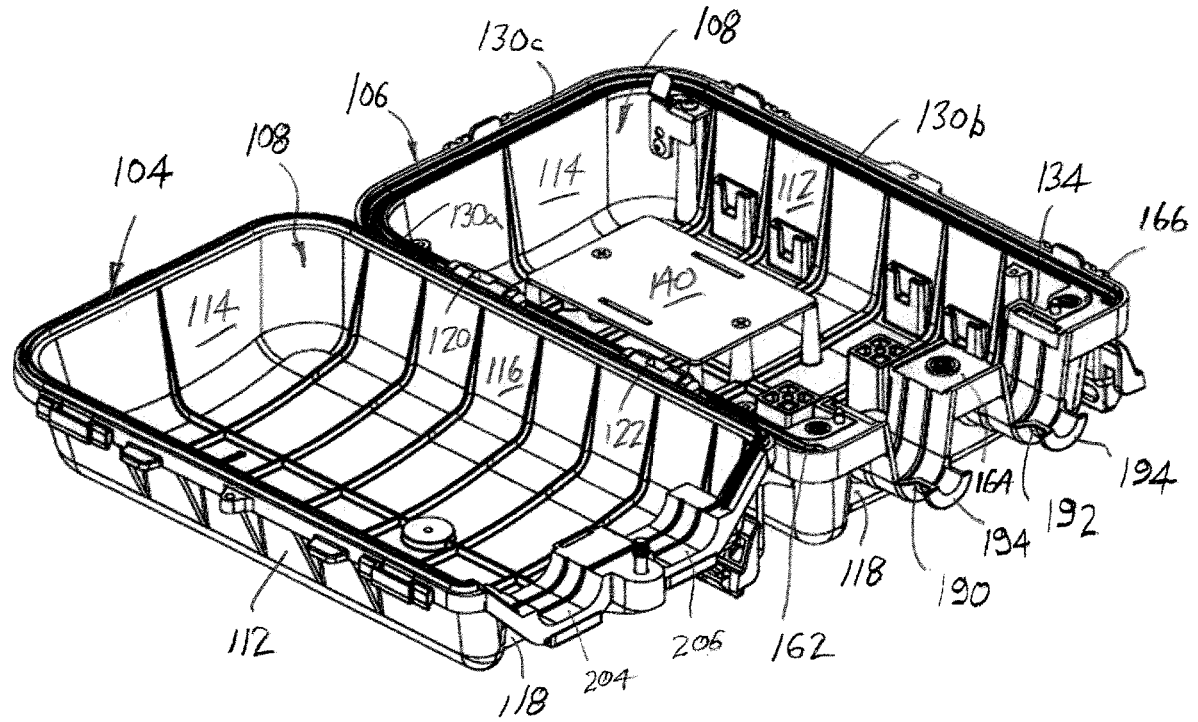
FIG. 3 is a perspective view similar to FIG. 2 with the perimeter seal and splice tray mounting plate shown in an assembled position within the open splice enclosure.
Figure 4:
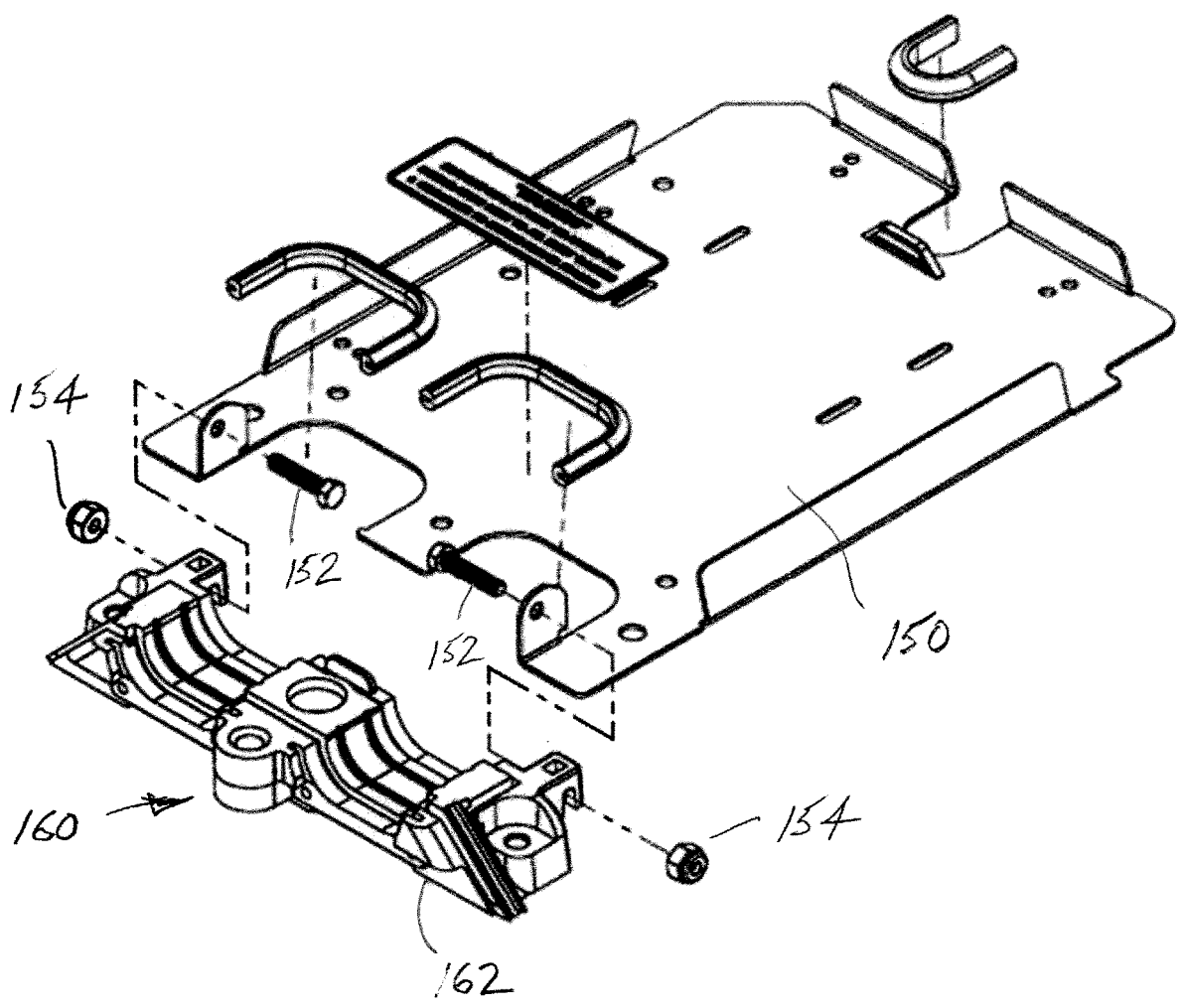
FIG. 4 is an exploded perspective view of a panel divider shown disassembled from a portion of a grommet overmold housing.
Figure 5:
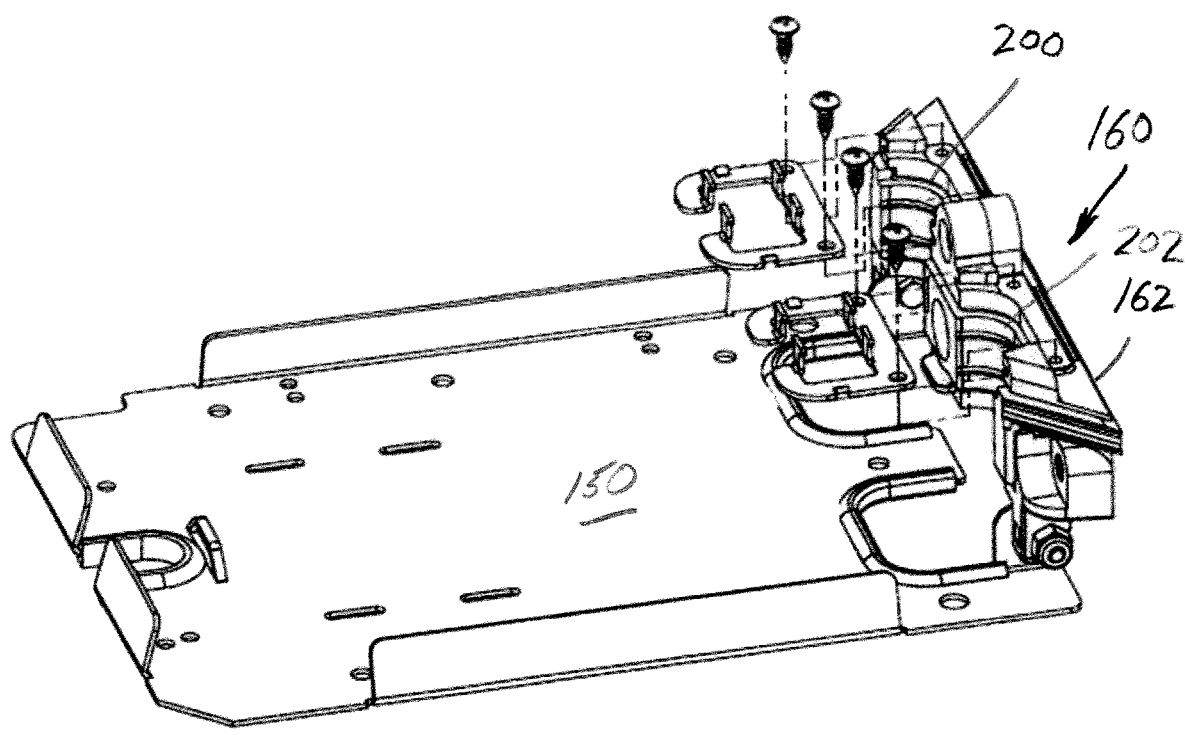
FIG. 5 illustrates the panel divider of FIG. 4 hingedly secured to a portion of the grommet overmold housing.

Turning initially to FIGS. 1-3, there is shown a splice enclosure 100 having a housing 102 formed of first and second housing portions 104, 106. Each housing portion 104, 106 is similarly sized. Preferably, each housing portion 104, 106 has a rectangular wall portion 110 with first, second, third, and fourth sidewall portions 112, 114, 116, 118 extending generally perpendicular from the wall portion 110 to form a cavity portion 108. Terminal edges of the sidewall portions 112, 114, 116, 118 of housing portion 104 that are spaced from the rectangular wall portion 110 are located for facing, mating, abutting engagement with the sidewall portions of housing portion 106 in the closed condition (FIG. 1), and the sidewall portions extend in the same direction from their respective rectangular wall portions when the housing portions are disposed in the open position (FIGS. 2 and 3). The housing portions 104, 106 are preferably joined along adjacent edge portions by conventional hinges 120, 122 that allow the housing portions to alternatively adopt the closed configuration (FIG. 1) wherein the internal cavity 108 (formed by the facing cavity portions of each housing portion) of the housing 102 can be sealed from the external environment, and an open configuration (FIGS. 2 and 3) to gain access to the internal cavity. Preferably, the housing portions 104, 106 are assembled together along respective sidewall portions by the hinges 120, 122. A greater or lesser number of hinges could be provided to allow the housing portions to be selectively oriented in the closed position of FIG. 1 and the open position of FIGS. 2 and 3.

Each housing portion 104, 106 is preferably a one-piece or integral molded polymer construction having a suitable thickness and rigidity (and may include ribs to increase the strength and rigidity of the wall portions 110, 112, 114, 116, 118 of the housing portions) to withstand external environmental conditions, as well as to permit the cavity 108 when the splice enclosure 100 is in the sealed, closed condition shown in FIG. 1, to be pressurized and further limit ingress of dirt and/or moisture from the external environment into the cavity. To provide the desired sealing from the environment, at least one of the housing portions 104, 106 includes a resilient seal member or gasket 130 (FIGS. 2 and 3). In the preferred arrangement, a groove or recess 132 is provided in one of the housing portions (here, the base housing portion 106). The groove 132 extends along entire length of the terminal edges of the sidewall portions 112, 114, 116, and partially along the terminal edge of sidewall portion 118. Thus, both the gasket 130 and the groove 132 that receives the gasket have a generally U-shaped conformation (namely, elongated, parallel gasket portions 130a, 130b that extend generally perpendicularly from interconnecting portion 130c) and distal ends of the gasket portions 130a, 130b merge into turned-in end regions 130d. The turned-in end regions 130d include end pockets 134. The incoming/outgoing fiber optic cables and the outgoing drop cables are also sealed against the external environment as will be described below.

Also illustrated in FIGS. 2 and 3 is splice tray mounting plate 140 that is secured in the cavity 108 at a predetermined height above the inner surface of the rectangular wall portion 110 of the second housing portion 106. More particularly, cone-shaped bosses (unnumbered in FIGS. 2-3) extend into the cavity from the wall portion 110 and the mounting plate 140 is secured to the bosses by fasteners such as threaded screws. The mounting plate 140 provides a stable work surface on which the conventional splice tray 142 (FIG. 7) can be supported during splicing of individual fibers from the incoming fiber optic cable. As is well known, the outer jacket of the cable is cut to expose buffer tubes which are likewise removed to access the individual fibers contained in the buffer tubes. Further, internal fiber management is accomplished with supplied tie wraps, clips, and routing passages to hold a desired amount of slack in the fibers that are to be spliced. A fiber is spliced to a respective end of a pigtail connector, and an opposite end of the connector is fed to an adapter where the connector is plugged in to the adapter, typically a snap-fit connection between the connector and adapter. The adapter serves as an interface between the pigtail connector and the drop cable. The adapter and/or drop cables may be one of a variety of commercially available components and the present disclosure directed to the splice enclosure need not be limited to a specific type of adapter/connector arrangement. The individual drop cables are inserted into fiber drop grommets as will be described further below in connection with FIG. 8.

Figure 6:
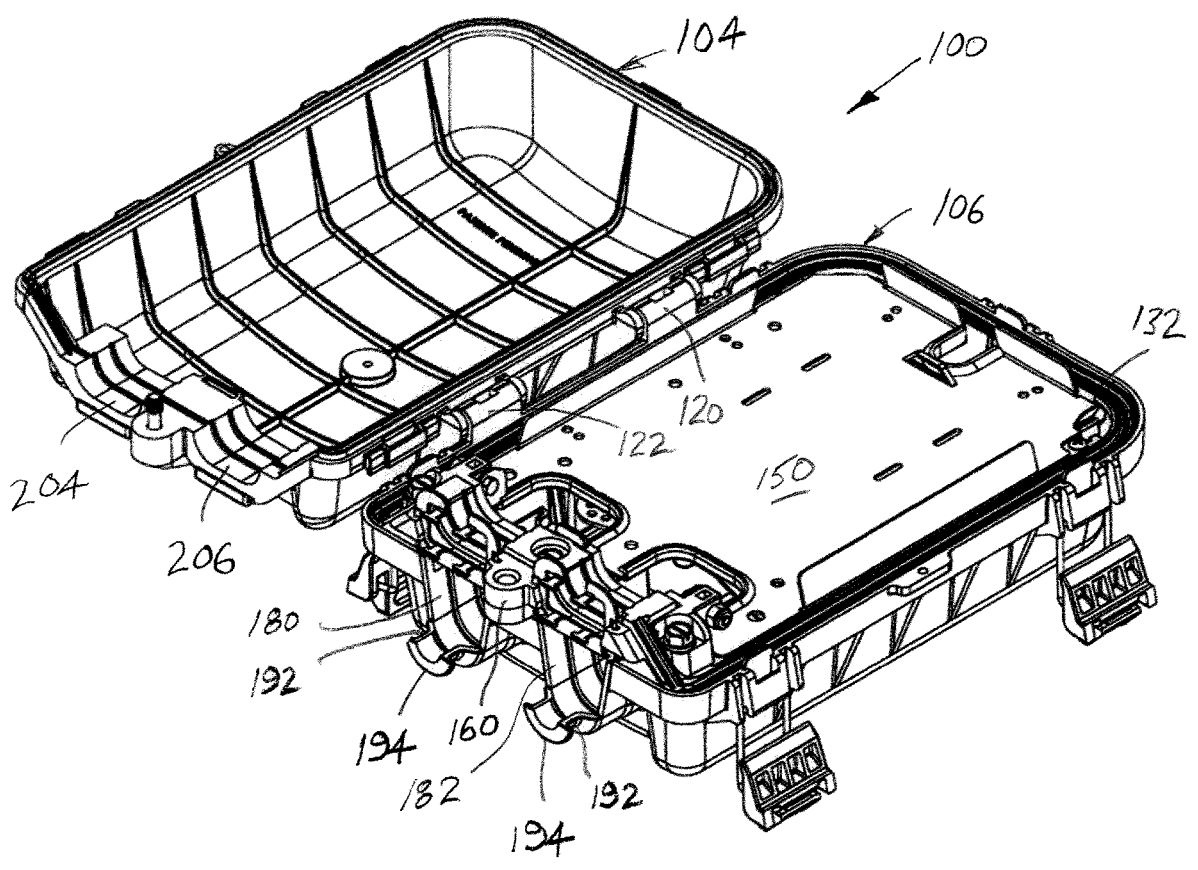
FIG. 6 illustrates the panel divider and grommet overmold housing in the opened splice enclosure, with the panel divider shown in a first, closed position in the open splice enclosure.

With continued reference to FIGS. 1-3, and additional reference to FIGS. 4-7, there is illustrated a hinged divider panel 150. The divider panel 150 is a rigid, planar member that is secured to the housing 102 in a manner that covers the support plate 140 and splice tray (not shown) (FIG. 6) held in the housing portion 106 and thereby segregates the splicing region of the housing cavity from the distribution portion of the cavity associated with housing portion 104. Specifically, divider panel 150 is a generally planar component that is secured via a fastener such as a threaded bolt 152 and nut 154 located at one end of the divider panel. The fastener allows selective pivoting action of the divider panel 150 around the axis of the fastening bolt (compare the closed position of the divider panel in FIG. 6 with the open position in FIG. 7). The divider panel 150 has a generally rectangular perimeter shape that is dimensioned to substantially close off access to that portion of the cavity 108 in the housing portion 106 (FIG. 6). The divider panel 150 is secured by the threaded fastener 152, 154 to a bridge 160 (FIGS. 11-13) where the bridge is configured to close off a central portion of the sidewalls 118 of the first and second housing portions. Thus, first, second, and third planar landings 162, 164, 166 (FIG. 3) support the bridge 160, and specifically support a lower, planar surface 168 of the bridge that is received on the planar landings (FIGS. 6-8 and 11-13). The bridge surface 168 cooperates with U-shaped recesses 180, 182 in the sidewall portions 118 to form through passages 184, 186 that receive incoming and outgoing portions of the fiber-optic cable. Particularly, the passages 184, 186 receive compressible, pliable grommets 188 (FIG. 8) that span between the outer diameter of the fiber optic cables (input and output fiber optic cables) and the passages 184, 186 and provide an effective seal about the outer perimeter s of the fiber option cables.

Crescent-shaped retention collars 190, 192 extend outwardly from the sidewall portions 118 of the housing portion 106 and each include a perimeter flange 194 at a terminal end thereof to provide strain relief and prevent pullout of the fiber-optic cable from the splice enclosure 100. Once the ingoing and outgoing cable is received in the associated grommet 188, a Zip-tie or cable clamp is placed over the perimeter of the cable and over the outer surface of the college 190, 192 at a location located inwardly of the flange 194. Any axial pullout force imposed on the fiber-optic cable is thus resisted as a result of the Zip-tie or clamp abuttingly engaging the flange 194.

Figure 8:
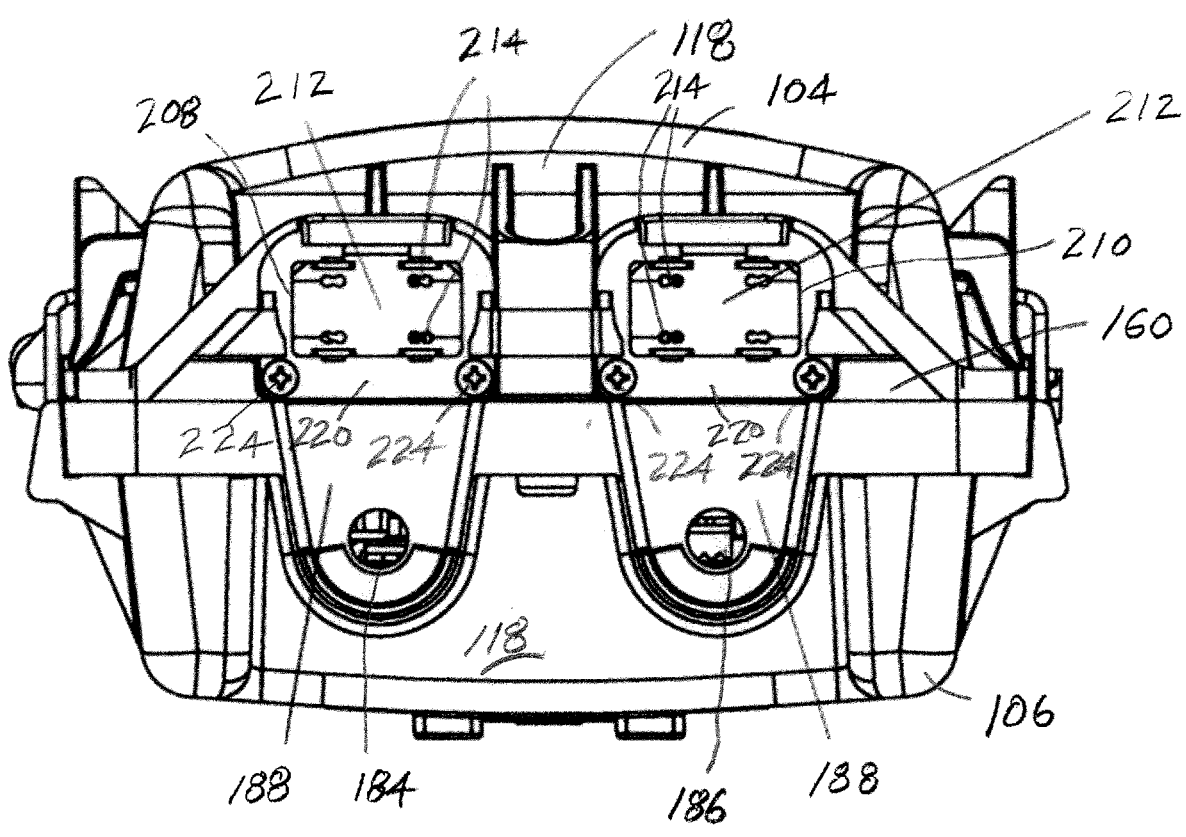
FIG. 8 is a front end view of the splice enclosure.
Figure 10:
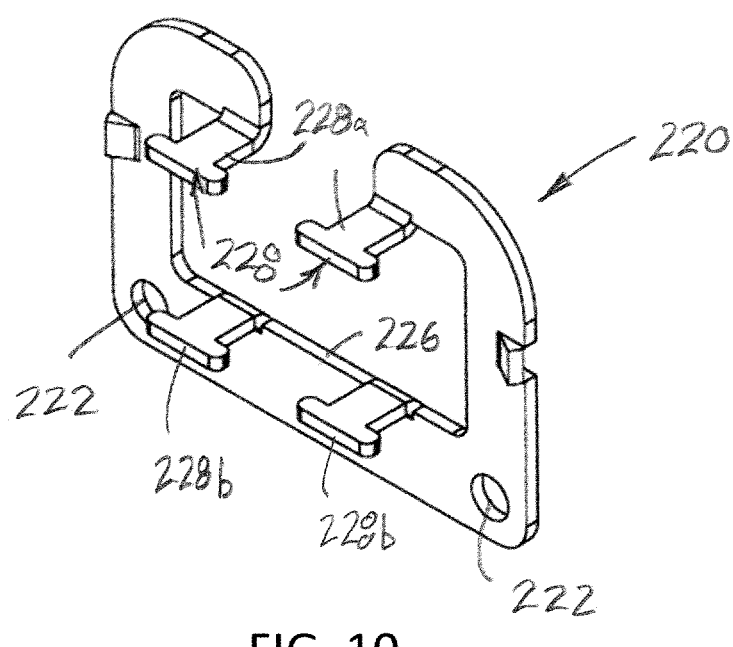
FIG. 10 is a perspective view of a preferred form of a strain relief bracket.
Figure 11:
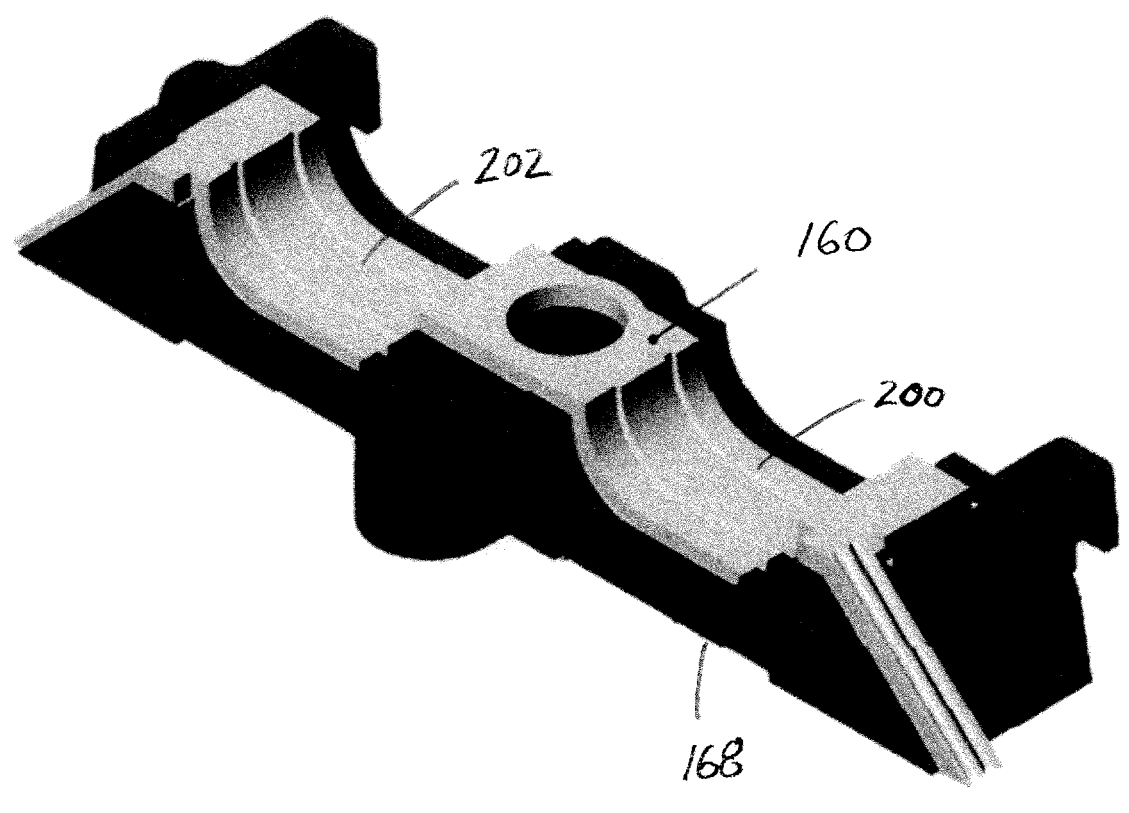
FIG. 11 is a perspective view of a bridge support portion of the grommet overmold assembly provided at one end of the splice enclosure.
Figure 12:
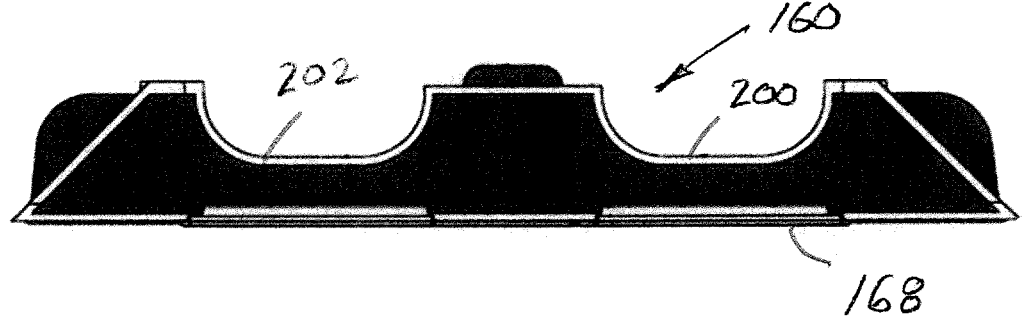
FIG. 12 is an elevational view of the bridge support portion of FIG. 11.
Figure 13:
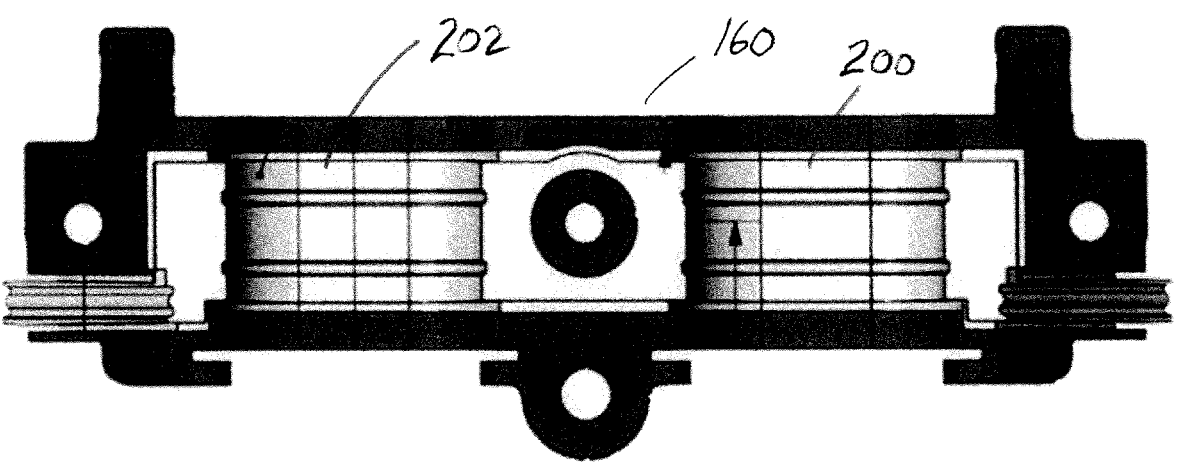
FIG. 13 is a top plan view of the bridge.

Further, the bridge 160 includes curvilinear recesses 200, 202 and that portion of the bridge opposite from planar surface 162. The curvilinear recesses 200, 202 cooperate with similarly shaped recesses 204, 206 extending outwardly from sidewall 118 of the housing portion 104 to form through passages 208, 210. A compressible, pliable grommet 212 is provided in each passage 208, 210 and openings 214 in the grommet seal around the outer perimeter of the drop cables exiting the housing (FIG. 8). The specific number of openings 214 in the grommets 212 may vary (e.g., four or six in each grommet, for a total of eight or twelve openings per enclosure, although still other numbers of openings are possible). Also secured to an outer face of the bridge 160 are a pair of strain relief brackets 220, one of which is shown enlarged in FIG. 10. For example, through holes 222 receive fasteners 224 (FIG. 8) to secure brackets 220 to the outwardly facing surface of the bridge 160. An inner perimeter portion 226 of each bracket provides a recessed opening therethrough whereby the drop cables exiting through grommet 212 can pass through the bracket. In addition, strain relief members 228 extend perpendicularly outward from an outer face of the bracket 220. The strain relief members 228 are generally T-shaped (FIG. 10) so that a zip-tie or clamp can be received around the drop cable and extend around narrow portions 228a of the T-shape to provide strain relief for the drop cables. In this manner, the drop cables can resist pullout forces imposed thereon since the zip-tie or clamp abuttingly engages enlarged portions 228b of the T-shaped strain relief members 228.

Figure 7:
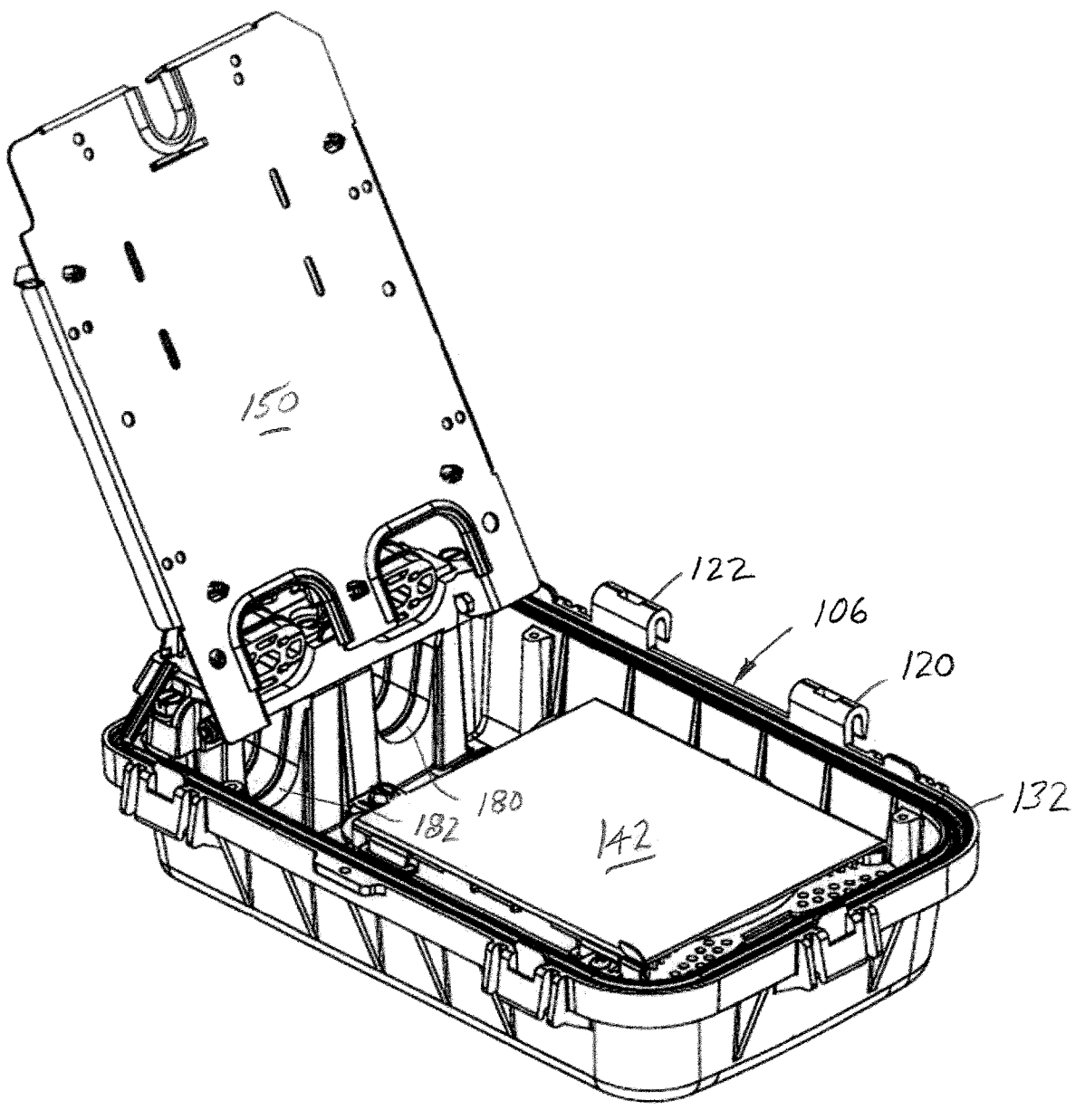
FIG. 7 shows the panel divider panel in a second, open position, i.e., hinged upwardly, relative to the open splice enclosure to allow access to a bottom section that receives a feeder cable and splice tray assembly.
Figure 9:
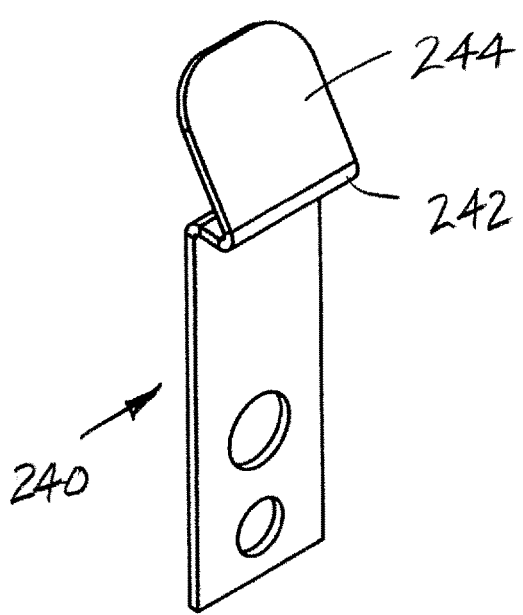
FIG. 9 is a perspective view of a preferred form of spring latch used to retain the divider panel in the first, closed position shown in FIG. 6.

FIG. 9 illustrates a preferred form of a spring latch 240 mounted to one of the sidewalls (e.g., sidewall 112 of the housing portion 106). The spring latch 240 includes a generally perpendicular protrusion 242 that is dimensioned to overlie and engage a surface of the divider panel 150 (FIG. 6). An inclined, angled surface 244 is dimensioned for engagement with the underside surface of the divider panel 150 when the divider panel is rotated from its open position (FIG. 7) to its closed position (FIG. 6). The divider panel 150 slides over the angled surface 244 and beneath the protrusion 242 to retain the divider panel in the closed position until the spring latch is manually moved outwardly to allow the divider panel to freely pass past the protrusion 242 and pivot the divider panel to the open position (FIG. 7).

Figure 14:
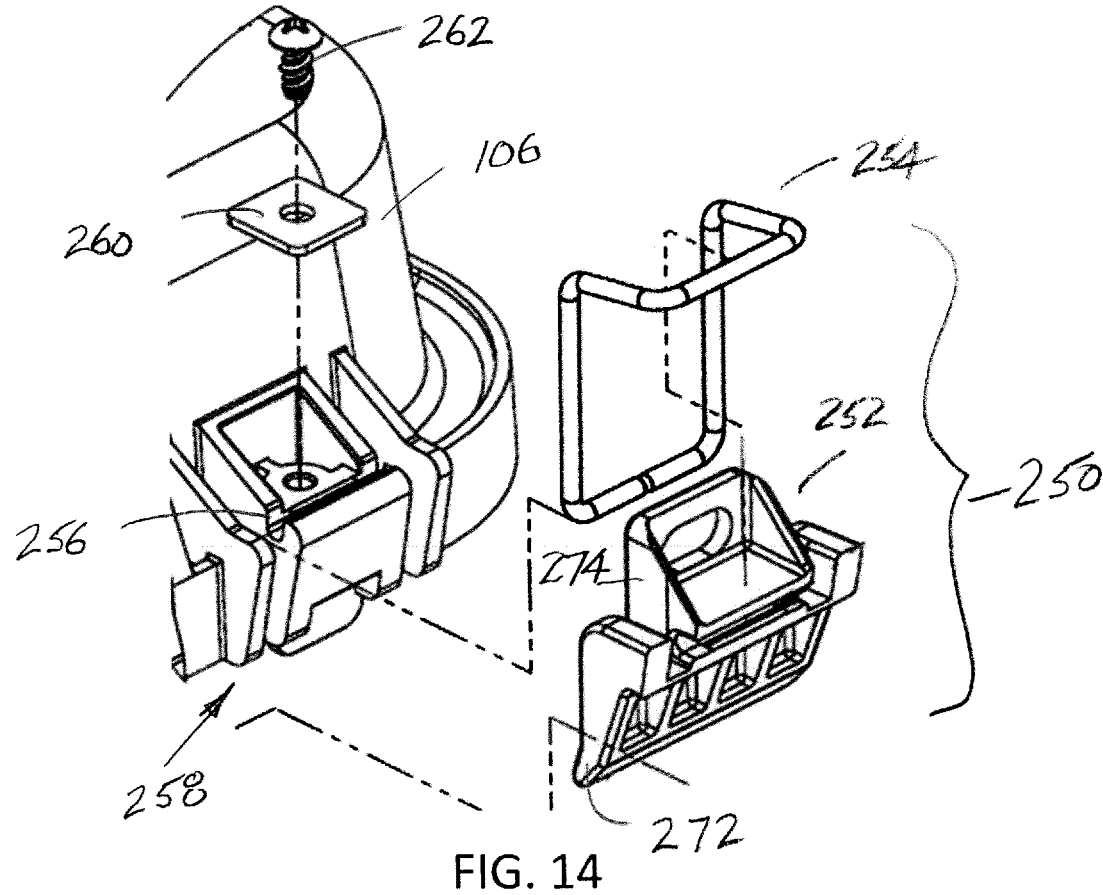
FIG. 14 is an exploded view of a preferred latch assembly used at selected perimeter locations of the splice enclosure.
Figure 15:
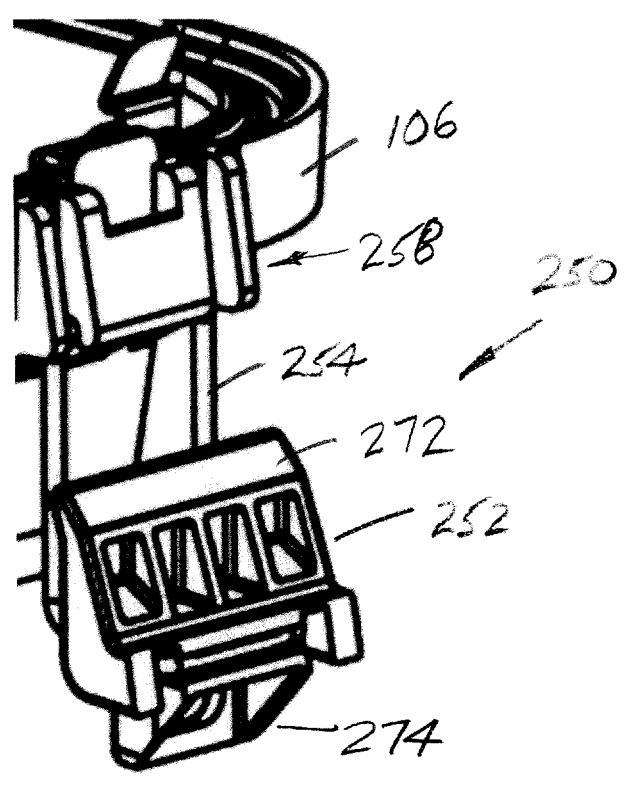
FIG. 15 is a perspective view of the latch assembly of FIG. 14 shown in assembled position at a perimeter location of the splice enclosure.
Figure 16:
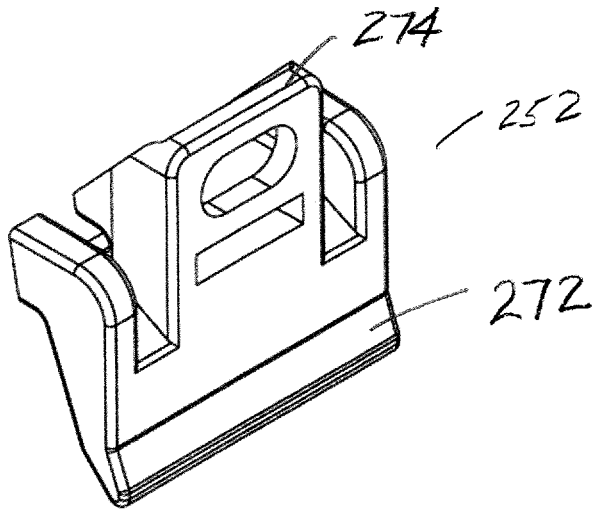
FIG. 16 is a perspective view of a first, outer surface of a handle of the latch assembly.
Figure 17:
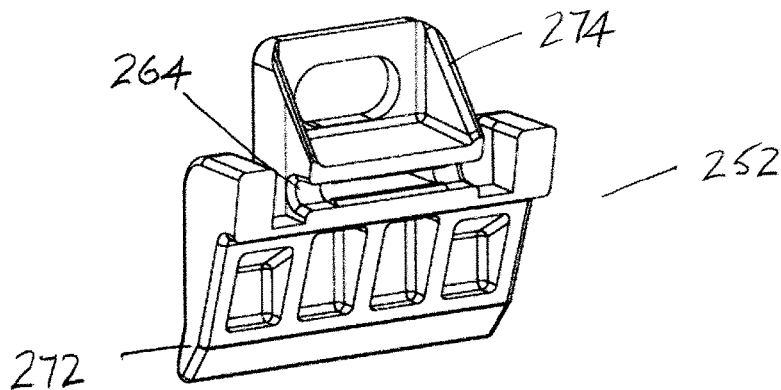
FIG. 17 is a perspective view of a second, inner surface of the handle of the latch assembly shown in FIG. 16.
Figure 18:
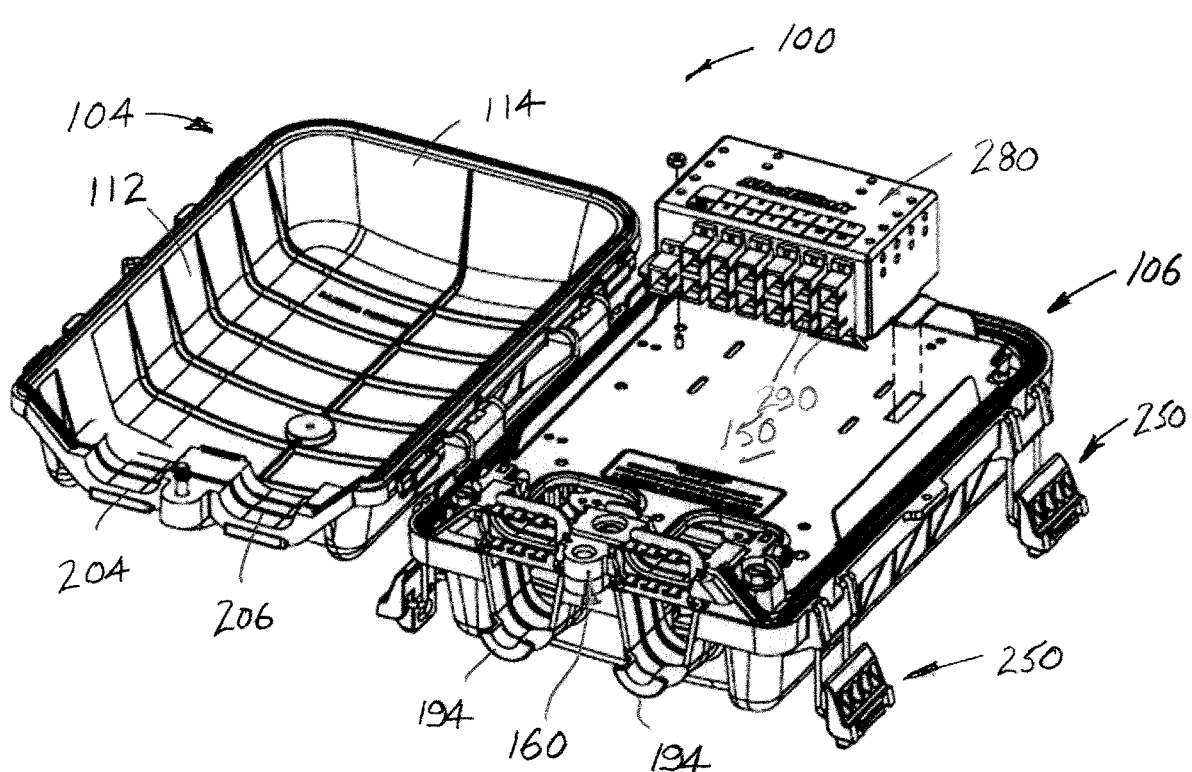
FIGS. 18-22 show the addition of an adapter housing into the splice enclosure.
Figure 19:
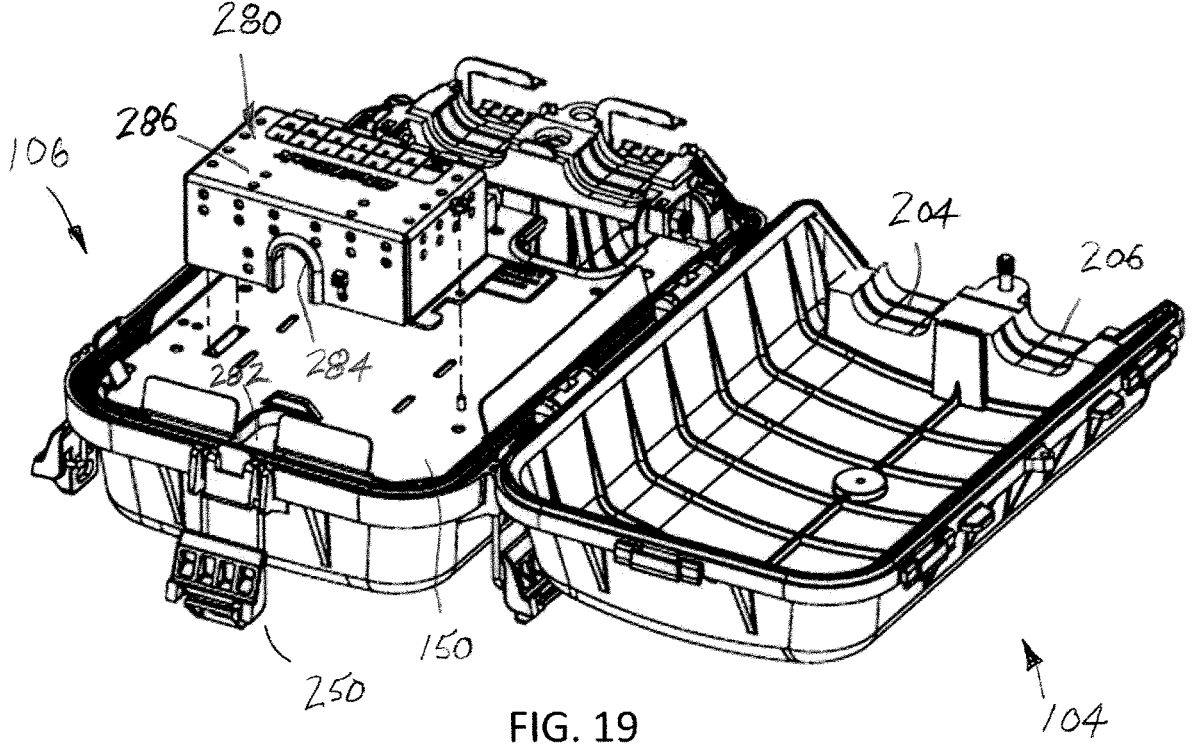

FIGS. 14-17 illustrate an improved handle latch assembly 250 for the splice enclosure 100. The handle latch assemblies 250 are preferably positioned in space locations about the perimeter of the housing 102. The latch assembly 250 includes a latch handle 252 assembled via a retainer wire 254 received in a mounting region recess 256 (FIG. 14) at one of the perimeter locations 258 (FIG. 15) of the housing portion 106. Once the retainer wire 254 is snap-fit into the mounting region recess 256, a retainer plate 260 is secured by a fastener such as threaded fastener 262 to overlie the retainer wire and prevent inadvertent removal (FIG. 14). The latch handle 252 likewise includes a mounting recess 264 (FIG. 17) that receives an offset portion of the retaining wire 254. This offset portion of the retaining wire 254 provides for an over-center latching action of the latch handle 252 over retaining shoulders 270 provided on housing portion 104. Specifically, the angled nose portion 272 is oriented for receipt behind the retaining shoulder 270, and continued pressure exerted on actuating portion 274 of the latch handle 252 pivots the nose portion 272 over the retaining shoulder 270 and snap-fits the latch handle to tightly secure the first and second housing portions 104, 106 together. In one preferred arrangement, multiple, (e.g., five) latch assemblies 250 are provided at spaced locations about the perimeter of the housing, although will be understood that a greater or lesser number of latch assemblies may be provided as deemed necessary.

Figure 20:
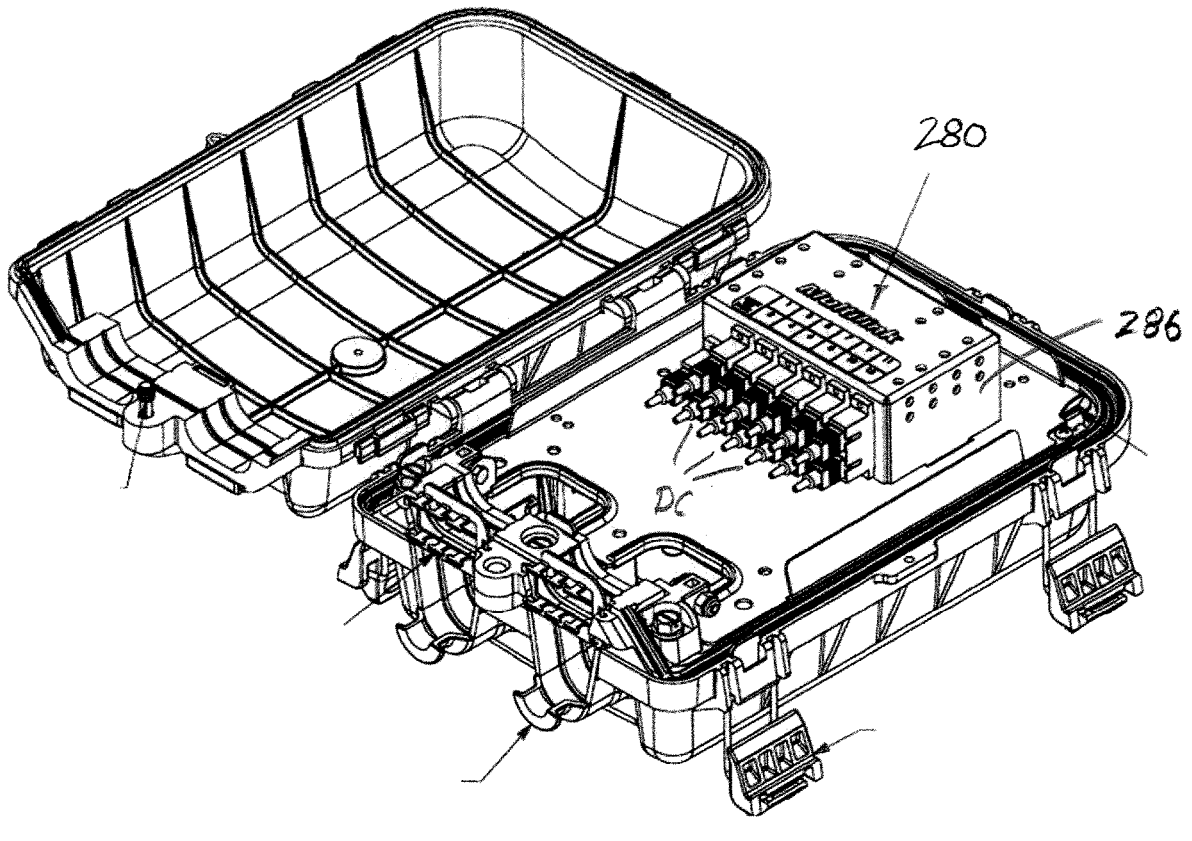
Figure 21:
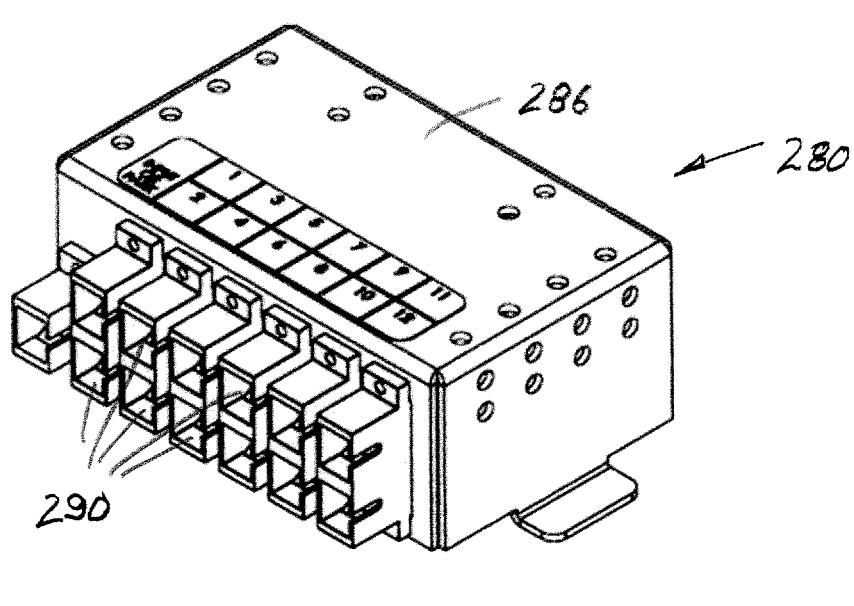
Figure 22:
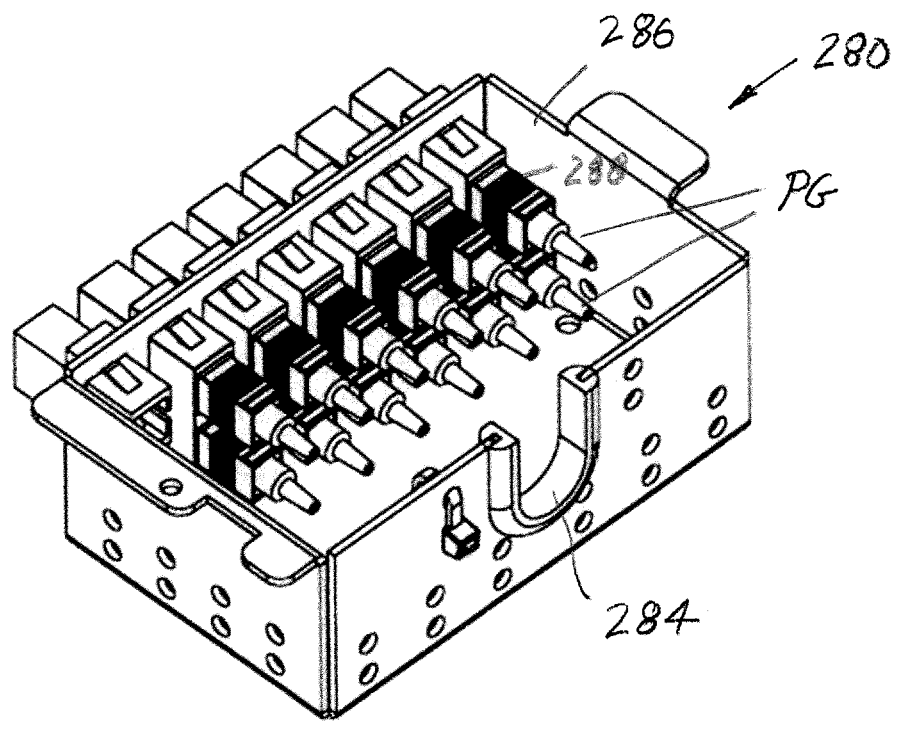

A further embodiment is illustrated in FIGS. 18-22 in which an output adapter housing 280 is shown mounted to a surface of the pivoting divider panel 150. An input fiber-optic cable is received into the first portion of the enclosure housing. Fibers from the input cable are spliced to a fiber end of a respective pigtail PG. The pigtails PG are then routed through a U-shaped slot or feedthrough 282 (FIG. 19) in the pivoting divider panel 150 and likewise through a similarly U-shaped slot or feedthrough 284 (FIGS. 19 and 22) in a cover 286 of the adapter housing 280. The adapter cover 286 is removed to allow connectors 288 of the pigtails PG to be plugged in to the adapter (FIG. 22). On the other side of the adapter, exposed ends of drop cables DC are inserted into a respective port 290 the adapter, and an audible "click" for example, confirms that the drop cable connection is secured in the adapter (FIGS. 20 and 21). The other end of each drop cable DC (e.g., flat, round, etc.) exits the enclosure housing through a respective grommet opening 214 (FIG. 8). The enclosure latches 250 are subsequently latched to provide a closed enclosure cavity.

This written description uses examples to describe the disclosure, including the best mode, and also to enable any person skilled in the art to make and use the disclosure. Other examples that occur to those skilled in the art are intended to be within the scope of the invention if they have structural elements that do not differ from the same concept or that do not differ from the literal language of the claims, or if they include equivalent structural elements with insubstantial differences from the same concept or from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

Although specific advantages have been enumerated above, various embodiments may include some, none, or all of the enumerated advantages. Although exemplary embodiments are illustrated in the figures and description herein, the principles of the present disclosure may be implemented using any number of techniques, whether currently known or not. Moreover, the operations of the systems and apparatuses disclosed herein may be performed by more, fewer, or other components, and the methods described herein may include more, fewer, or other steps. Additionally, steps may be performed in any suitable order.

To aid the Patent Office and any readers of this application and any resulting patent in interpreting the claims appended hereto, applicants do not intend any of the appended claims or claim elements to invoke 35 USC 112 (f) unless the words "means for" or "step for" are explicitly used in the particular claim.

What is claimed is:

1. A splice enclosure comprising:
   a housing having first and second housing portions that form an internal enclosed cavity in a first position and allow access to the cavity in a second position, the first housing portion having an inlet passage and an outlet passage to receive an associated fiber optic cable in and out of the internal enclosed cavity, the associated fiber optic cable comprising one or more associated optical fibers to be joined to associated drop cables in the internal enclosed cavity, wherein the associated drop cables exit the housing through at least one drop cable passage;
   a seal assembly including a first seal portion configured to seal around the associated fiber optic cable at the inlet and outlet passages, and a second seal portion configured to seal around the associated drop cables; and
   a divider panel hinged to the housing for selective positioning between a first position overlying the first housing portion and restricting access thereto in the first position, and a second position allowing access to the first housing portion and the spliced associated optical fibers, wherein the divider panel is secured to the second seal portion of the seal assembly.

2. The splice enclosure of claim 1 wherein the at least one drop cable passage and second seal portion are formed in the second housing portion.

3. The splice enclosure of claim 2 wherein the divider panel is hinged to the second seal portion adjacent the at least one drop cable passage to allow the divider panel to selectively move between the first and second positions thereof without adversely impacting the associated drop cables.

4. The splice enclosure of claim 1 further comprising a spring latch dimensioned to engage a surface of the divider panel and maintain the divider panel in the first position.

5. The splice enclosure of claim 4 wherein the spring latch includes a protrusion that overlies and engages the divider panel in the first position.

6. The splice enclosure of claim 5 wherein the spring latch is formed of a material allowing the spring latch to be resiliently deflected from the first position to the second position.

7. The splice enclosure of claim 5 wherein the spring latch protrusion extends generally perpendicular and an angled portion at a terminal end thereof.

8. The splice enclosure of claim 1 further comprising an adapter housing secured to the divider panel.

9. The splice enclosure of claim 8 wherein the adapter housing includes adapters on a face thereof that allow splitter or pigtails to be connectorized.

10. The splice enclosure of claim 9 wherein the pigtails extend to a splice tray mounted in the first housing portion.

11. The splice enclosure of claim 2 further comprising a spring latch dimensioned to engage a surface of the divider panel and maintain the divider panel in the first position.

12. The splice enclosure of claim 11 wherein the spring latch includes a protrusion that overlies and engages the divider panel in the first position.

13. The splice enclosure of claim 12 wherein the spring latch is formed of a material allowing the spring latch to be resiliently deflected from the first position to the second position.

14. The splice enclosure of claim 12 wherein the spring latch protrusion extends generally perpendicular and an angled portion at a terminal end thereof.

* * * * *